Figure 1:
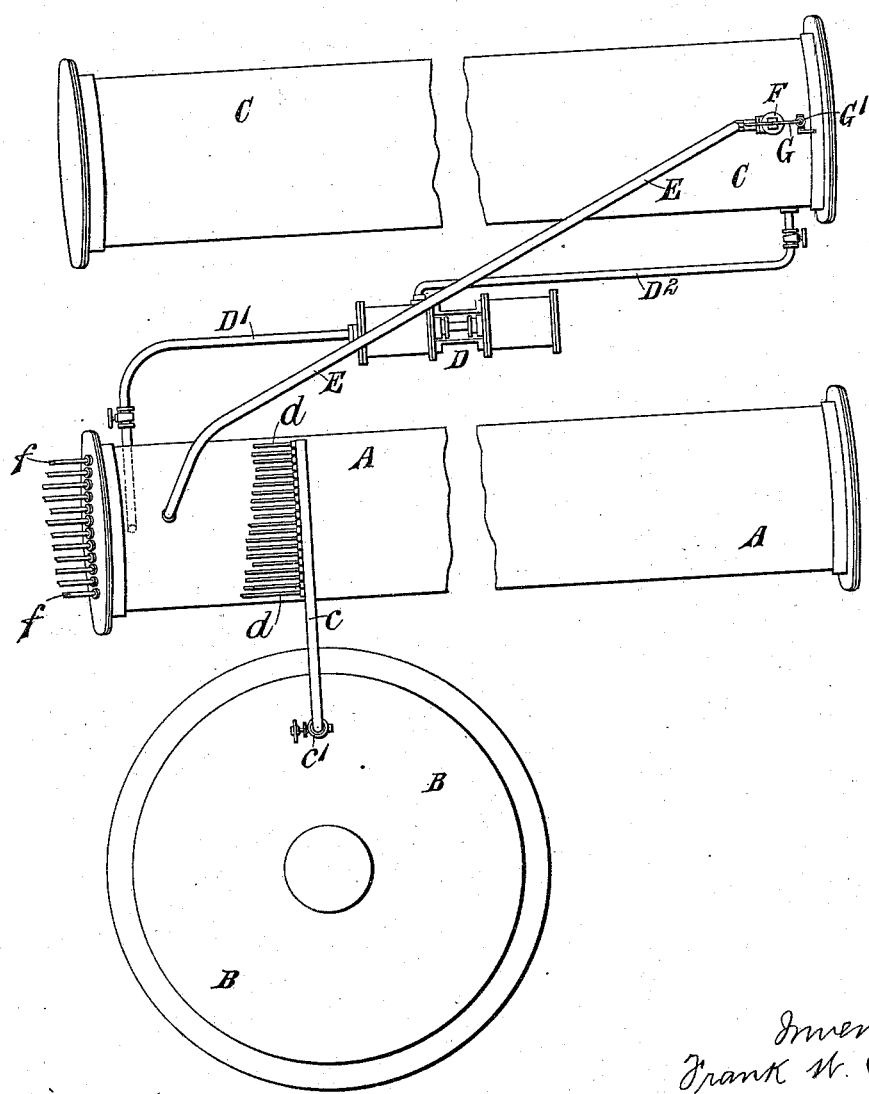

(No Model.)

F. W. CLARK.
DISTILLATION AND BREAKING UP OF LIQUID HYDROCARBONS AND APPARATUS THEREFOR.

No. 547,332.

3 Sheets—Sheet 1.

Patented Oct. 1, 1895.

Witnesses:
G. W. Rea.
Vinton Coombs

Inventor:
Frank W. Clark,
By James L. Norris
Atty.

(No Model.) 3 Sheets—Sheet 2.

F. W. CLARK.
DISTILLATION AND BREAKING UP OF LIQUID HYDROCARBONS AND APPARATUS THEREFOR.

No. 547,332. Patented Oct. 1, 1895.

Witnesses:
G. W. Rea.
Vinton Coombs

Inventor:
Frank W. Clark,
By James L. Norris
Atty.

(No Model.) 3 Sheets—Sheet 3.
F. W. CLARK.
DISTILLATION AND BREAKING UP OF LIQUID HYDROCARBONS AND APPARATUS THEREFOR.
No. 547,332. Patented Oct. 1, 1895.
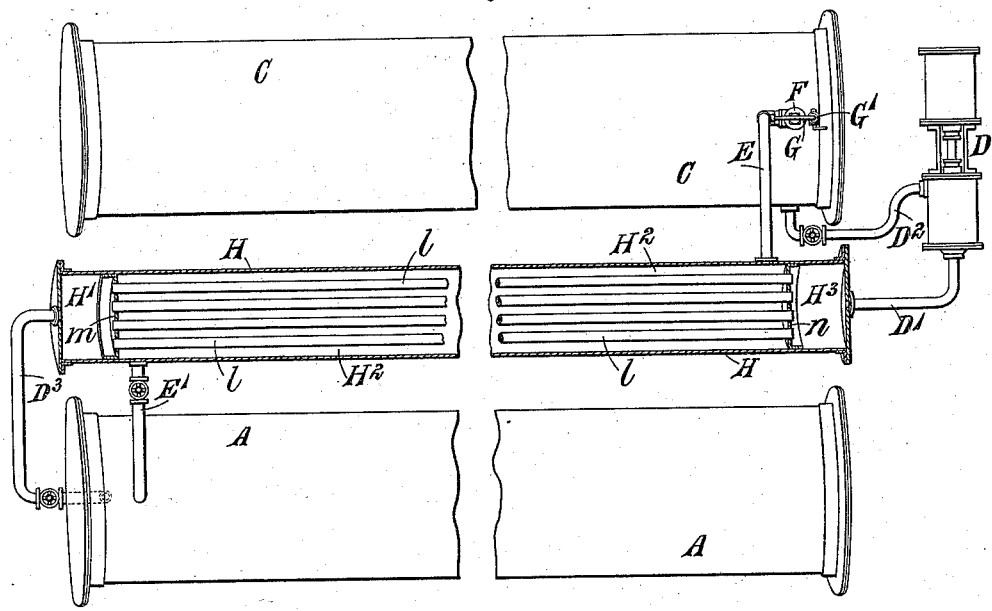
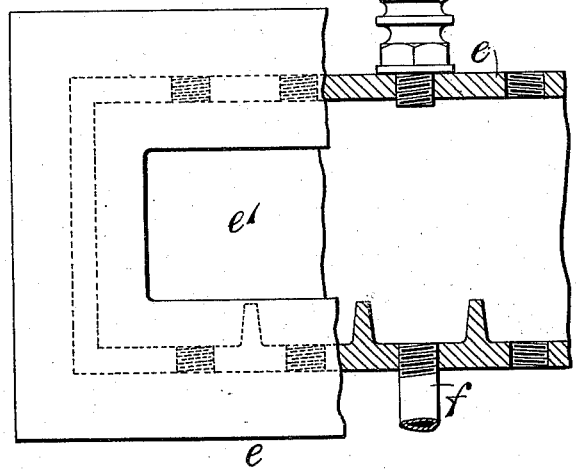
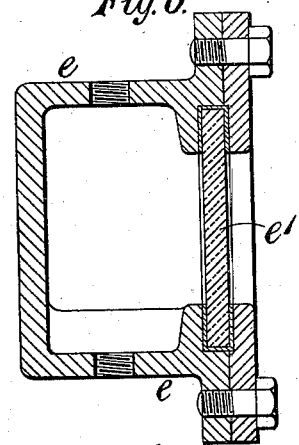
Witnesses:
G. W. Rea.
Vinton Coombs
Inventor:
Frank W. Clark,
By James L. Norris
Atty.

UNITED STATES PATENT OFFICE.

FRANK W. CLARK, OF LONDON, ENGLAND, ASSIGNOR TO THE FRANK W. CLARK & COMPANY, LIMITED, OF SAME PLACE.

DISTILLATION AND BREAKING UP OF LIQUID HYDROCARBONS, AND APPARATUS THEREFOR.

SPECIFICATION forming part of Letters Patent No. 547,332, dated October 1, 1895.

Application filed May 31, 1894. Serial No. 513,063. (No model.) Patented in England March 1, 1893, No. 4,510, and in Belgium February 26, 1894, No. 108,750.

*To all whom it may concern:*

Be it known that I, FRANK WILLIAM CLARK, engineer, a subject of the Queen of Great Britain, residing at London, England, have invented new and useful Improvements Relating to the Distillation and Breaking Up of Liquid Hydrocarbons and Similar Substances and to Apparatus Therefor, (for which I have obtained patents in the following countries: Great Britain, No. 4,510, dated March 1, 1893, and Belgium, No. 108,750, dated February 26, 1894,) of which the following is a specification.

My invention relates to the distillation and breaking up of liquid hydrocarbons and other volatile liquids or spirits, and its object is to provide simple and efficient means for separating and collecting the different grades or specific gravities of such liquids.

An important feature of my said invention is the use of a carrier—such as air or other gas—which is passed over thin or shallow streams of the liquid in an evaporator or retort and is then conducted into one or more condensers for the purpose of conveying into the same the vapor from the said evaporator.

My said invention comprises an improved method or process which consists, essentially, in introducing the liquid in the form of thin or shallow streams into a suitable evaporator and vaporizing the more volatile portion or portions of the said liquid therein by the application of heat or by reduction of pressure, or by both the application of heat and reduction of pressure, conveying the vapor from the said evaporator by means of a carrier, such as air, into a condenser, in which it is cooled or subjected to pressure, or is both cooled and subjected to pressure, so as to insure the condensation of the said vapor, the air or other carrier preferably being kept circulating through the apparatus and used over and over again for conveying or carrying the vapor from the evaporator to the condenser. In some instances I convey the vapor successively through two or more condensers, in which it is subjected to different degrees of cold or of pressure, or both. The heavier or less volatile portions of the liquid, which are not vaporized in the evaporator, are collected therein and are run into a tank or drawn off from time to time. The products of condensation are also from time to time drawn off from the condenser or condensers. By this treatment the said liquids may be effectually broken up or separated into different grades or specific gravities; and by varying the temperature or the pressure or vacuum in the evaporator or condenser or condensers, and other conditions under which the process is carried on, I can obtain products of condensation or distillation of higher or lower specific gravity or boiling or evaporating point from the evaporator and condenser or condensers, as required. In some cases it is necessary to create a vacuum or partial vacuum in the evaporator.

My said invention also comprises improved apparatus wherein an evaporator, provided with means for supplying the liquid in suitably-regulated quantities thereto, is connected with a condenser or condensers and with a pump or equivalent device for circulating the air or other carrier through the said evaporator and condenser or condensers.

My said invention also comprises other improvements hereinafter described.

Figure 2:
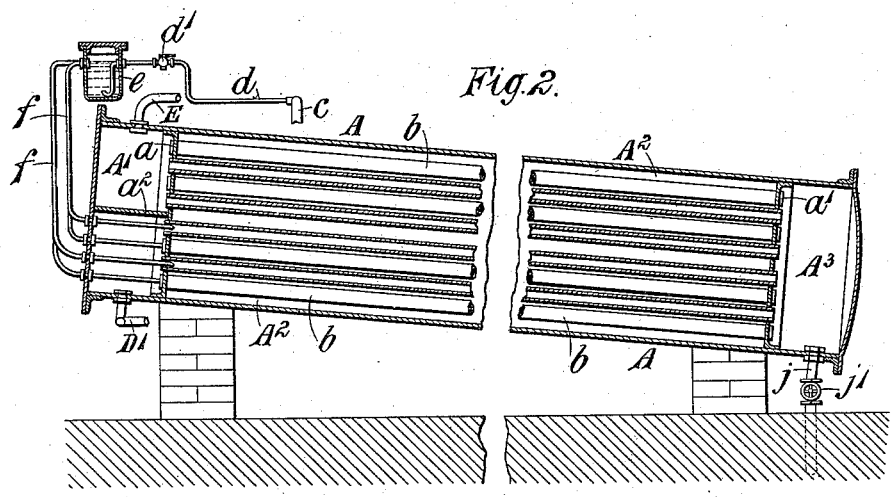
Figure 3:
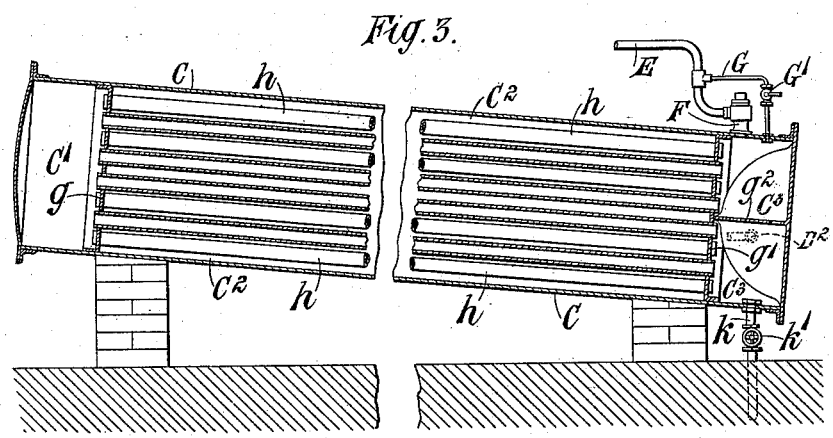

In the accompanying drawings, Figure 1 is a plan of one arrangement of the said apparatus. Fig. 2 is a longitudinal central section of the evaporator. Fig. 3 is a longitudinal central section of the condenser. Fig. 4 is a plan, partly in horizontal section, showing another arrangement of my said apparatus. Fig. 5 is a front elevation, partly in vertical section; and Fig. 6, a transverse section showing a modified arrangement of the feed-regulating boxes hereinafter described.

A is the evaporator, which is divided into compartments $A'$ $A^2$ $A^3$, Fig. 2, by means of plates $a$ $a'$. In the central and larger compartment $A^2$ are arranged tubes $b$, which extend at their upper end through the plate $a$ into the compartment $A'$ and at their lower end through the plate $a'$ into the compartment $A^3$. Steam, hot water, or other suitable heating medium is to be introduced into or circulated through the compartment $A^2$ outside the tubes $b$, while a suitable carrier, such as air, is circulated through the said tubes, as hereinafter described. The compartment A' is divided by a horizontal plate or partition $a^2$, so that there are as many tubes $b$ above as there are below the said partition.

B is a reservoir for containing the liquid to be distilled and broken up. This reservoir is connected by a pipe $c$ and branch pipes $d$ with a regulating-box $e$. The regulating-box $e$ is divided up into compartments or sections by means of walls or partitions $e^2$ in such manner that the opening of each branch pipe $d$ and that of each pipe $f$ lies within the corresponding compartment. There are as many of these branch pipes $d$ as there are tubes $b$ below the partition $a^2$ in the evaporator, and in combination with each branch pipe $d$ is provided a pipe $f$, extending from the space in the upper part of the regulating-box $e$ into one of the said tubes $b$, so that the liquid, which enters the regulating-box through either branch pipe $d$, will flow through the corresponding pipe $f$ into the corresponding tube $b$. The pipe $c$ is provided with a cock or valve $c'$ for regulating or controlling the flow of the liquid from the tank B, and each of the branch pipes $d$ is provided with a cock or valve $d'$ for regulating the flow of the liquid through the corresponding compartment or section of the box $e$.

The evaporator A is preferably inclined, as shown in Fig. 2, so that the liquid entering the tubes $b$ will flow by gravity toward or into the compartment $A^3$.

C is the condenser, which, like the evaporator, is divided into compartments $C'$ $C^2$ $C^3$ by means of plates $g$ $g'$, the central and larger compartment $C^2$ having arranged therein tubes $h$, which extend at their upper end through the plate $g$ into the compartment $C'$ and at their lower end through the plate $g'$ into the compartment $C^3$. The condenser C is also preferably inclined, as shown in Fig. 3. Cold water or other suitable cooling medium is to be introduced into or circulated through the compartment $C^2$ outside the tubes $h$, the carrier, with the hydrocarbon vapor, being passed through the said tubes. The compartment $C^3$ is divided by a horizontal partition $g^2$ in such a manner that there are as many tubes above as there are below the said partition. The said partition may have one or more holes formed therein to permit the flow into the space below it of any liquid that may be carried over into the space above it.

D is an air-pump of any suitable description, the suction-pipe $D'$ of which is connected with the compartment $A'$ of the evaporator below the partition $a^2$, the delivery-pipe $D^2$ of the said pump D being connected with the compartment $C^3$ of the condenser C below the partition $g^2$. The space above the said partition $g^2$ in the condenser is connected with the compartment $A'$ of the evaporator above the partition $a^2$ by a pipe E, which is, if necessary, provided with a loaded or spring valve F, so constructed that the load on the valve can be readily adjusted or regulated at will. The valve F serves to produce a resistance to the passage of the air or other carrier out of the condenser C, and thus causes a condensation or rise of pressure in the said condenser and a rarefaction or diminution of pressure in the pipe E and in the evaporator A as the said air or other carrier is circulated through the apparatus by the pump D, a low pressure being, as is well known, advantageous for evaporation, and a high pressure for condensation or liquefaction. A by-pass G, having a stop-cock or valve $G'$, is provided around the said valve for the purpose hereinafter explained.

The compartment $A^3$ of the evaporator is provided with a pipe $j$ and a draw-off cock $j'$, and the compartment $C^3$ of the condenser is provided with a pipe $k$ and a draw-off cock $k'$.

If necessary or desirable, the evaporator A is provided with a suitable vacuum-gage and the condenser C with a suitable pressure-gage.

In the arrangement shown in Fig. 4, I provide an equalizer or temperature-exchanger H, consisting of a cylindrical chamber provided with tubes $l$, supported in tube-plates $m$ $n$, which divide the said chamber into compartments $H'$ $H^2$ $H^3$. The compartment $H'$ is connected by a pipe $D^3$ with the compartment $A'$ of the evaporator below the partition $a^2$, while the compartment $H^3$ is connected by the suction-pipe $D'$ with the pump D, the delivery-pipe $D^2$ whereof is connected with the compartment $C^3$ of the condenser below the partition $g^2$. The compartment $H^2$ of the equalizer is connected at one end by the pipe E to the compartment $C^3$ of the condenser above the partition $g^2$, and at the other end by a pipe $E'$ with the compartment $A'$ of the evaporator above the partition $a^2$. Therefore the heated air and vapor from the evaporator will be drawn through the tubes $l$, while the cooled air from the condenser passes through the compartment $H^2$ outside the said tubes $l$, and an equalization or exchange of temperature will take place, the air and vapor from the evaporator being somewhat cooled before passing into the pump D and condenser C and the air from the condenser being warmed before passing into the evaporator.

My improved method or process is carried into effect in the apparatus above described and shown in the drawings as follows—that is to say: The compartments $A'$ $A^3$ of the evaporator A and the compartments $C'$ $C^3$ of the condenser, and the pipes and tubes connected therewith are first charged with a suitable carrier, such as air or other gas. The pump D is then started and draws the air or other carrier from the evaporator and forces it into the condenser. At the same time steam or hot water is caused to circulate through the compartment $A^2$ of the retort and cold water or other cooling medium through the compartment $C^2$ of the condenser. The cock $c'$ and the cocks $d'$ are then opened to admit liquid from the tank B to the regulating-box $e$, and the said cocks $d'$ are so adjusted that the flow of the said liquid through the several compartments of the box $e$ is equal or about equal, and a thin or shallow stream of the liquid will flow through the tubes $f$ into each of the tubes $b$ below the partition $a^2$. The supply of the liquid to all of these tubes can then be simultaneously increased or diminished by means of the cock $c'$, the supply to either of the said tubes being regulated independently, if necessary, by means of the corresponding cock $d'$. As the liquid passes through the said tubes, the lighter or more volatile portion or portions of such liquid are vaporized by the heat of the steam or hot water surrounding the said tubes and the vapor is drawn or carried out of the evaporator by means of the dry air or other carrier and forced into the condenser by the pump D. The heavier or less volatile portions of the said liquid pass through the tubes $b$ into the compartment $A^3$. The vapor thus forced into the condenser in passing through the tubes $h$ thereof is condensed by the pressure therein, combined with the cooling effect of the cold water surrounding the said tubes, and the liquid of condensation collects in the compartment $C^3$. The air or other carrier is forced from the condenser through the pipe E, the loaded valve F controlling or governing its flow through the said pipe in such a manner as to maintain the desired low pressure or vacuum in the retort and the desired higher pressure in the condenser.

It is evident that liquids of different specific gravity or boiling or evaporating point will be collected in the compartments $A^3$ and $C^3$. These liquids are drawn off from time to time into barrels or other receptacles through the pipes $j$ $k$. To facilitate this drawing off the cock G' in the by-pass G may be opened, so as to equalize the pressure throughout the apparatus and thus prevent the rarefaction in the evaporator A from impeding the flow of the liquid from the compartment $A^3$ through the pipe $j$.

In the arrangement shown in Figs. 1, 2, and 3 each pipe $d$ extends downward in a separate compartment of the box $e$ and is turned upward at its extremity. The various compartments of the said box are filled nearly up to the orifices of the pipes $f$ with water, through which the liquid, entering through either pipe $d$ into the box $e$, will rise and can be seen rising, a window of glass or other suitable material being provided for the purpose, as shown, for example, at $e'$, Figs. 5 and 6.

In the modification of my regulating-box shown in Figs. 5 and 6 the branch pipes $d$ are connected through the cocks $d'$ with the top of the box $e$ and deliver the liquid into shallow compartments in the lower part of the said box. With each of these compartments is connected a pipe $f$ for conducting the liquid into one or other of the tubes $b$ of the evaporator or retort. The cocks $c'$ and $d'$ should be so adjusted that as nearly as possible equal quantities of the liquid shall flow through the several pipes $f$ into the corresponding tubes $b$.

My improved apparatus may, if desired, be so constructed that air will be drawn into the evaporator from the external atmosphere and will be forced through the condenser and allowed to escape through a suitably-loaded valve. It is, however, preferable to charge the apparatus in the first instance with air or other gas and to circulate this air or gas continuously through the apparatus, as above described, because loss of the hydrocarbon vapor is thus avoided.

Instead of employing tubes in the evaporator and condenser, as above described, I sometimes use suitable plates, over which the liquid will flow in thin or shallow streams and beneath which the heating medium may be circulated; or I provide other suitable heating-surfaces, over which the streams of liquid may be caused to flow; or in cases where only reduction of pressure is required to effect the volatilization of the liquid, I dispense with the means for applying heat to the liquid.

In some instances I evaporate the whole of the liquid in a suitable retort and convey the vapor, by means of the air or other carrier, successively through a series of condensers, in which it is subjected to different degrees of cold or pressure, or both, so that the different grades or specific gravities will be condensed and collected in the several condensers.

I sometimes use coal or other gas as the carrier for conveying the vapor from the evaporator or retort. In this case I can, if desired, conduct the gas enriched by the hydrocarbon vapor directly from the evaporator or retort through a pipe or main to be used for lighting or other purposes, instead of conducting it through a condenser or condensers, as above described.

What I claim is—

1. The method or process of distilling and breaking up liquid hydrocarbons or similar substances, which method or process consists in causing the liquid to flow in numerous thin or shallow streams in one direction over the operative surfaces of an evaporator or retort, circulating a carrier such as air first in contact with heating surfaces and then over said streams of liquid in the reverse direction and conveying the vapor therefrom by means of said carrier through a condenser and then conducting the carrier together with any uncondensed vapor from the condenser back into the evaporator or retort, the unvolatilized liquid in the evaporator or retort and the liquid of condensation in the condenser being drawn off as required, substantially as hereinbefore described and for the purposes specified.

2. The method or process of distilling and breaking up liquid hydrocarbons or similar substances, which method or process consists in causing the liquid to flow in thin or shallow streams over the operative surfaces of an evaporator or retort, drawing the vapor from the evaporator or retort by means of a carrier such as air, and forcing it into a condenser, and then conducting the carrier together with any uncondensed vapor from the condenser back into the evaporator or retort, the mixture of vapor and air being heated on its way from the condenser back into the evaporator or retort, and the unvolatilized liquid in the evaporator or retort and the liquid of condensation in the condenser being drawn off from time to time, substantially as and for the purposes above specified.

3. The method or process of distilling and breaking up liquid hydrocarbons or similar substances, which method or process consists in causing the liquid to flow in thin or shallow streams over the operative surfaces of an evaporator or retort, conveying the vapor from the evaporator or retort into a condenser by means of a carrier such as air, and forcing the carrier together with any uncondensed vapor from the condenser back into the evaporator or retort, under a pressure less than that maintained in the condenser, the unvolatilized liquid in the evaporator or retort and the liquid of condensation in the condenser being drawn off from time to time, substantially as hereinbefore described and for the purposes specified.

4. The method or process of distilling and breaking up liquid hydrocarbons or similar substances, which method or process consists in causing the liquid to flow in thin or shallow streams over the operative surfaces of an evaporator or retort, drawing the vapor from the evaporator or retort by means of a carrier such as air, and forcing it into a condenser, and then forcing the carrier together with any uncondensed vapor back into the evaporator or retort under a pressure less than that maintained in the condenser, the mixture of vapor and air passing from the evaporator or retort to the condenser being caused to impart some of its heat to that passing from the condenser back to the evaporator or retort, and the unvolatilized liquid in the evaporator or retort and the liquid of condensation in the condenser being drawn off from time to time, substantially as hereinbefore described and for the purposes specified.

5. In a distilling apparatus, the combination with an evaporator or retort having a series or group of tubular or other heating surfaces, and a series or group of tubular or other evaporating surfaces, pipes provided with controlling valves or cocks for the supply of the liquid in regulated quantities to the said surfaces, one or more condensers, a pump or its equivalent for circulating a suitable carrier for the vapor through the said evaporator first in contact with the heating and then in contact with the evaporating surfaces thereof and through the said condenser or condensers, and pipes or conduits connecting the said pump, evaporator and condenser or condensers one with another, substantially as hereinbefore described and for the purposes specified.

6. In a distilling apparatus, the combination of an evaporator or retort, a condenser, a pipe or passage connecting the said evaporator with the condenser, a loaded or spring valve in the said pipe or passage, a pump or its equivalent, and pipes or passages connecting the same respectively with the said evaporator and condenser, substantially as and for the purposes above specified.

7. In a distilling apparatus, the combination of an evaporator, a condenser, a pipe or passage connecting the said evaporator with the condenser, a loaded or spring valve in the said pipe or passage, a pipe or by-pass around the said valve, a controlling valve or cock in the said pipe or by-pass, a pump or its equivalent, and pipes or conduits connecting the same respectively with the said evaporator and condenser, substantially as and for the purposes above specified.

8. In a distilling apparatus, the combination of an evaporator or retort, a condenser, an equalizer or temperature-exchanger, a pump or its equivalent, and pipes or conduits connecting the said pump, the evaporator, the condenser and the equalizer or temperature-exchanger one with another, substantially as and for the purposes above specified.

9. In a distilling apparatus, the combination with an evaporator, of a box divided into compartments, a pipe connected with a tank or reservoir and provided with a controlling valve or cock, branch-pipes provided with controlling valves or cocks and connecting the said pipe with the several compartments of the said box respectively, and pipes connecting the said compartments with the respective vaporizing surfaces of the said evaporator, substantially as and for the purposes above specified.

FRANK W. CLARK.

Witnesses:
CLEMENT W. HAYDEN,
J. E. PROCTOR.